US006935145B2

(12) United States Patent
Howitt

(10) Patent No.: US 6,935,145 B2
(45) Date of Patent: Aug. 30, 2005

(54) STATIONARY AXLE / WHEEL LOCK ANTI-THEFT DEVICE

(76) Inventor: Douglas R Howitt, 3155 Tahsis Avenue, Coquitlam, B.C. (CA), V3B 6A2

( * ) Notice: Subject to any disclaimer, the term of this patent is extended or adjusted under 35 U.S.C. 154(b) by 0 days.

(21) Appl. No.: 10/409,715

(22) Filed: Apr. 9, 2003

(65) Prior Publication Data

US 2004/0020252 A1 Feb. 5, 2004

(51) Int. Cl.$^7$ .............................................. B60R 25/00
(52) U.S. Cl. ................................. 70/226; 70/14; 70/19; 188/32
(58) Field of Search ........................... 188/4 R, 32, 36; 70/14, 19, 236, 225, 226

(56) References Cited

U.S. PATENT DOCUMENTS

| | | | | |
|---|---|---|---|---|
| 3,537,548 A | * | 11/1970 | Jeppesen | 188/32 |
| 3,542,157 A | * | 11/1970 | Noah | 188/32 |
| 3,695,071 A | * | 10/1972 | West | 70/225 |
| 3,845,643 A | * | 11/1974 | Barrett | 70/18 |
| 4,649,724 A | * | 3/1987 | Raine | 70/226 |
| 4,786,223 A | * | 11/1988 | Crissy et al. | 410/20 |
| 4,804,070 A | * | 2/1989 | Bohler | 188/32 |
| 4,819,462 A | * | 4/1989 | Apsell | 70/14 |
| 5,040,389 A | * | 8/1991 | Beaudoin | 70/226 |
| 5,214,944 A | * | 6/1993 | Wolthoff | 70/226 |
| 5,263,553 A | * | 11/1993 | Duncan | 188/32 |
| 5,301,527 A | * | 4/1994 | Pollard | 70/226 |
| 5,410,897 A | * | 5/1995 | Edmondson | 70/226 |
| 5,437,171 A | * | 8/1995 | Owen | 70/14 |
| 5,689,981 A | * | 11/1997 | DeLuca et al. | 70/226 |
| 5,706,682 A | * | 1/1998 | Barker et al. | 70/226 |
| 5,715,711 A | * | 2/1998 | Jennison | 70/226 |
| 5,755,125 A | * | 5/1998 | Charrette | 70/226 |
| 5,832,759 A | * | 11/1998 | Yamabe | 70/226 |
| 6,125,672 A | * | 10/2000 | Diez | 70/226 |
| 6,725,979 B1 | * | 4/2004 | Snook | 188/32 |

* cited by examiner

Primary Examiner—Suzanne Dino Barrett

(57) ABSTRACT

A stationary axle/wheel lock anti-theft device for positioning and encumbering vehicle axle/wheel assembly movement in X-Y-Z-axis planes. Said device includes a base, a cylindrical blocking member and a security lock assembly. A frontal wheel barrier integral to the base restricts access to the front face of the vehicle wheel rim, axle hub, wheel nuts and cylindrical blocking member. Said barrier provides a restraining bore for the cylindrical blocking member in the locked position. Wheel chocks integral to the base localizes the vehicle wheel assembly, substantially aligning the vehicle axle with the cylindrical blocking member coaxially. The cylindrical blocking member is restrained in the extended position by mechanical means and serves to protect a security lock device from tampering. The cylindrical block member obstructs forward or rearward movement once the vehicle wheel assembly makes contact.

2 Claims, 6 Drawing Sheets

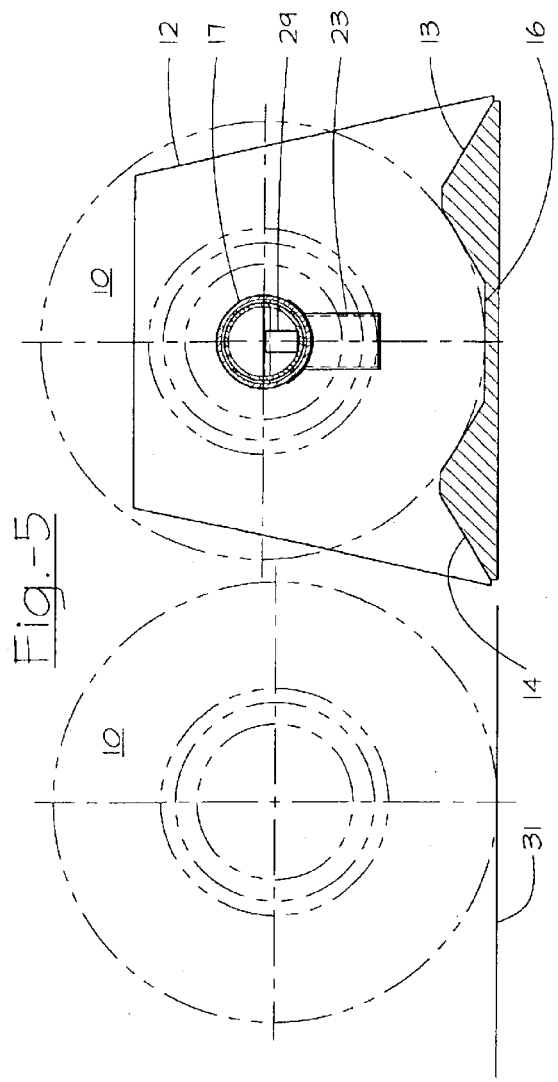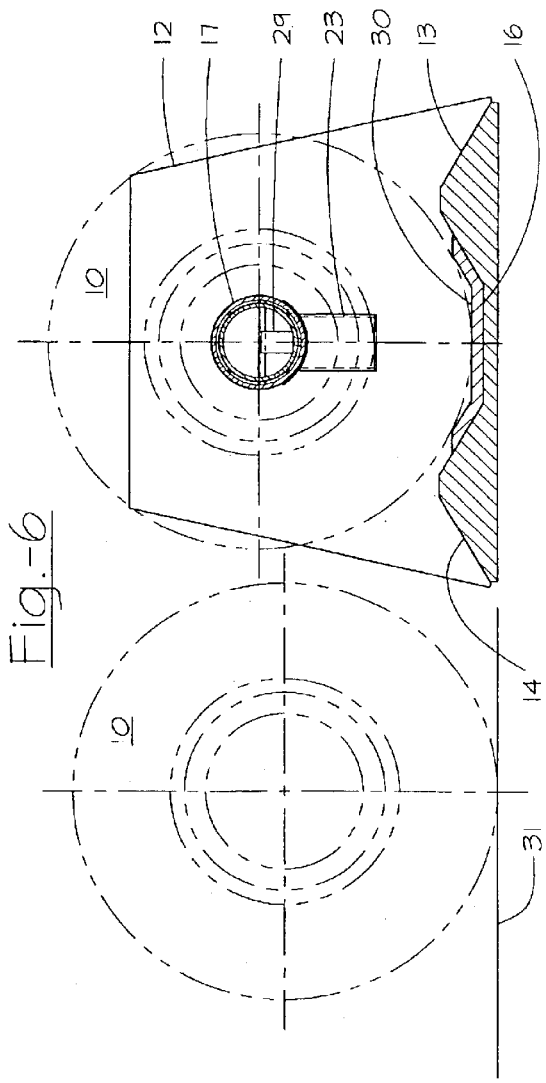

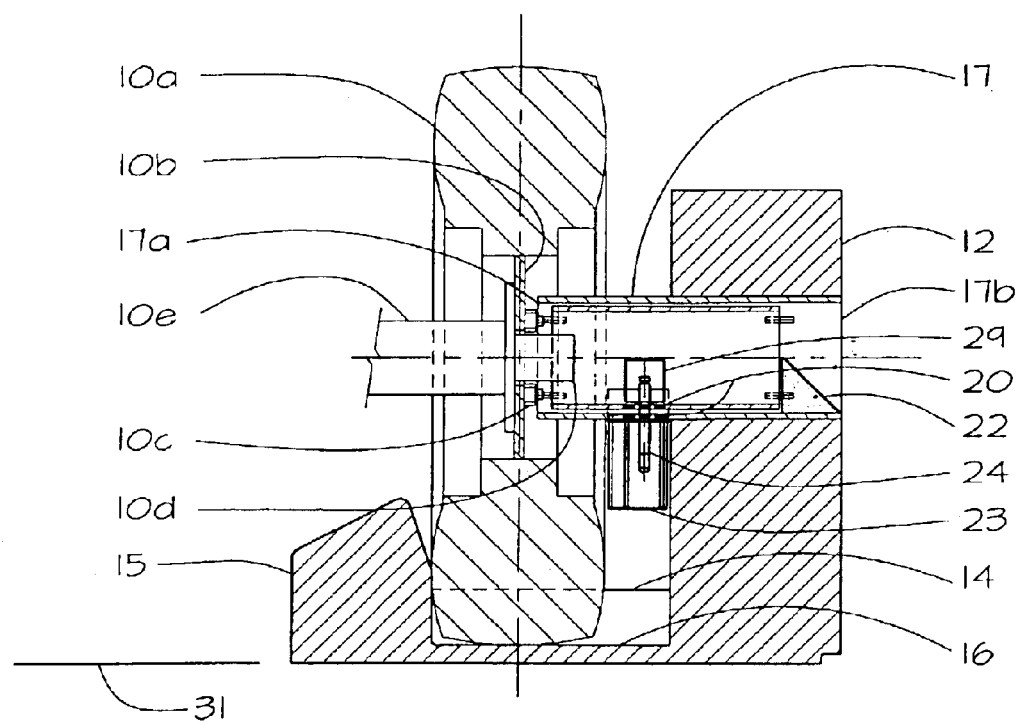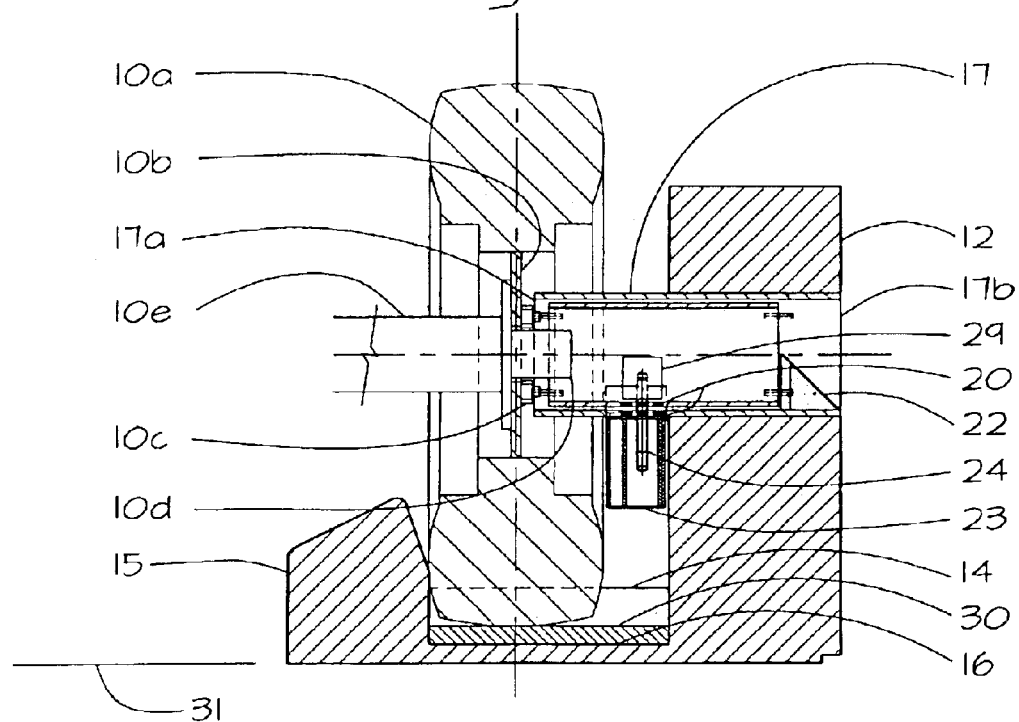

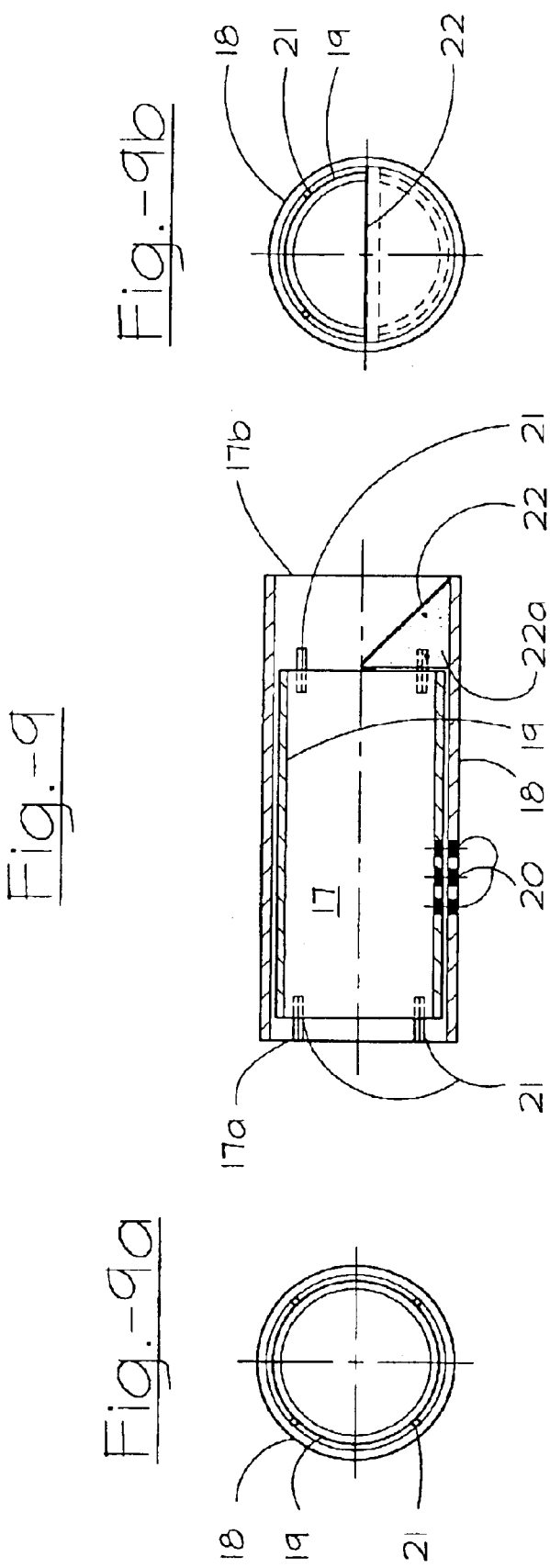

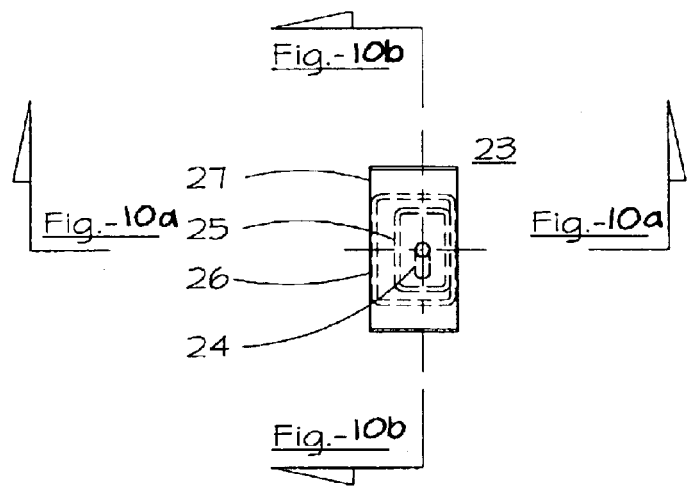
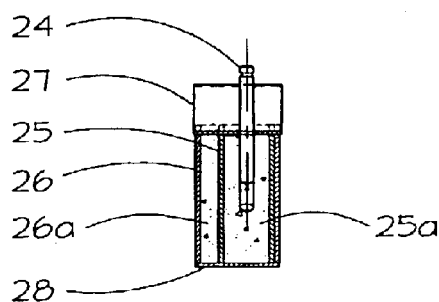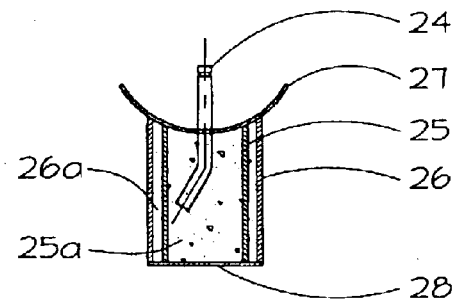

STATIONARY AXLE / WHEEL LOCK ANTI-THEFT DEVICE

FIELD OF THE INVENTION

The present invention relates in general to a vehicle wheel lock anti-theft devices and more particularly to a stationary vehicle axle/wheel lock anti-theft device, thereby preventing free rolling movement of the vehicle axle/wheel assembly in the simplest manner possible. The vehicle axle/wheel lock anti-theft device is designed for vehicle axle/wheel assemblies of single of multiple axle/wheel arrangements, single or multiple tire arrangements.

BACKGROUND OF THE INVENTION

As is well known various problems and difficulties are encountered in providing suitable means for protecting wheeled vehicles from being stolen. Thefts of parked vehicles from commercial properties, construction sites, storage yards, homes and the like are widespread. Expert thieves have little or no problem getting powered vehicles started without the use of keys, or towing vehicles away that are enchained to structures and having trailer hitch tongue locks by simply cutting or breaking exposed chains or locks.

Commercial vehicles, recreational vehicles, trailers, bobcats, tractors, large vehicles arrangements, multiple axle/ single wheel arrangements or multiple axle/wheel arrangements, are often park for an extended period of time. During this parking it is desirable to block the tires against movement, not only for safety against the vehicle rolling, but also for the purpose of securing the vehicle against theft.

Several types of devices have been employed to protect these vehicles from unauthorized removal. There are a wide variety of lockable wheel chock devices, which can be placed in between the ground surface and vehicle tires to prevent rolling of the tires. A disadvantage of these devices is that they are difficult to use on muddy ground.

Another type of wheel lock is attached to the vehicle frame and utilizes movable wedges that engage tire tread faces of a tandem wheel assembly. Several moving parts and leverage linkages are required for operation. The disadvantage of this type of devise is the difficulty of maintenance so that all parts and linkages continue to function.

It is an important object of the present invention to provide a vehicle axle/wheel lock anti-theft device which is of simple construction and versatile to serve multiple axle/ wheel/arrangements.

It is another object of the present invention to provide a vehicle axle/wheel lock anti-theft device which is of a simple locking or unlocking operation.

Still another object of the present invention is to provide a solid platform for a tire or tires to rest on between wheel chocks so that surrounding environmental conditions are not a factor affecting vehicle axle/wheel assembly encumbering.

It is another object of the present invention to provide a vehicle axle/wheel lock anti-theft device which accommodates multiple axle/wheel assemblies spaced between two and twelve inches apart at the closest portion of the treads of each tire.

Accordingly, the present invention as herein described is so designed as to provide an auxiliary manner of securing such vehicles and or tires and wheels thereof against movement of the vehicle and against theft.

Other objects and advantages of the present invention will be appreciated by reference to the following disclosure.

SUMMARY OF THE INVENTION

The present invention comprises, whereby the average wheeled vehicle can be safely parked on commercial properties, construction sites, storage yards, driveways and the like, without the fear of being stolen.

The vehicle wheel lock anti-theft device as herein disclosed includes an integral base having a generally 'L' shaped configuration. Wheel chocks integral to the base localizes the vehicle wheel assembly, substantially aligning the vehicle axle with the cylindrical block member coaxially. The integral base provides a solid vehicle wheel positioning platform so that surrounding environmental conditions are not a factor affecting vehicle axle/wheel assembly encumbering. The base provides a frontal wheel barrier that restricts access to the front face of the vehicle wheel rim, axle hub, wheel nuts and cylindrical blocking member. The frontal wheel barrier having sufficient structure and surface provides a restraining bore for the cylindrical blocking member in the locked position.

The cylindrical blocking member houses the security lock device within its interior. With vehicle axle/wheel assemblies having axle hubs that extend beyond the wheel rim frontal face, the extended cylindrical blocking member abutment substantially encircles said hub adding to movement restriction.

The stationary axle/wheel lock anti-theft device is constructed to withstand direct exposure to severe weather in an open outdoor environment.

In accordance with the above object, the present invention provides a wheel chock positioning base and a vehicle axle/wheel lock and anti-theft device for restricting movement of a vehicle having an axle/wheel combination.

Other aspects of the present invention will become apparent from the detailed description of the preferred embodiment, which follows, and from the claims.

BRIEF DESCRIPTION OF THE DRAWINGS

The preferred embodiment of the present invention will be described by reference to the drawings in which:

FIG. 5 is a section of the preferred embodiment of the stationary axle/wheel lock anti-theft device in which the rear wheel chock is not shown, the frontal wheel barrier is behind the vehicle axle/wheel assembly and a second vehicle axle/ wheel assembly is shown in close proximity to said first vehicle axle/wheel assembly;

FIG. 6 is a section of the preferred embodiment of the stationary axle/wheel lock anti-theft device in which the rear wheel chock is not shown, the frontal wheel barrier is behind the vehicle axle/wheel assembly illustrating the wheel height spacer positioned between the left wheel chock, the right wheel chock, the rear wheel chock, the frontal wheel barrier, the bottom wheel support platform and a second vehicle axle/wheel assembly is shown in close proximity to said first vehicle axle/wheel assembly;

FIG. 7 is a section of the preferred embodiment of the stationary axle/wheel lock anti-theft device in which the rear wheel chock is at the left and the frontal wheel barrier is at the right of the figure;

FIG. 8 is a section of the preferred embodiment of the stationary axle/wheel lock anti-theft device in which the wheel height spacer is positioned between the rear wheel chock at the left, the front wheel barrier at the right, the bottom wheel support platform and the vehicle axle/wheel assembly above;

FIG. 9 is a section of the preferred embodiment of the retaining sleeve assembly in which the axle-opening end is at the left and the handle/guard-opening end is at the right of the figure;

FIG. 9a is an end view of the preferred embodiment of the retaining sleeve assembly axle opening end;

FIG. 9b is a end view of the preferred embodiment of the retaining sleeve assembly handle/guard opening end;

FIG. 10 is a plan view of the preferred embodiment of the retaining sleeve stop bar assembly;

FIG. 10a is a section of the preferred embodiment of the retaining sleeve stop bar assembly;

FIG. 10b is a section of the preferred embodiment of the retaining sleeve stop bar assembly.

DESCRIPTION OF THE PREFERRED EMBODIMENT

Figure 1:
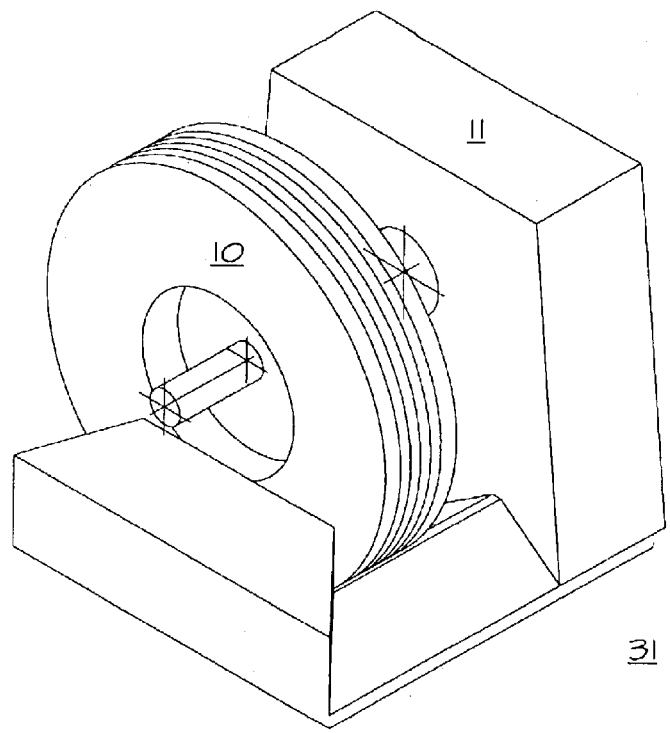
FIG. 1 is a perspective rear view of the preferred embodiment of the stationary axle/wheel lock anti-theft device in which the rear wheel chock is at the left and the frontal wheel barrier is at the right of the figure.
Figure 2:
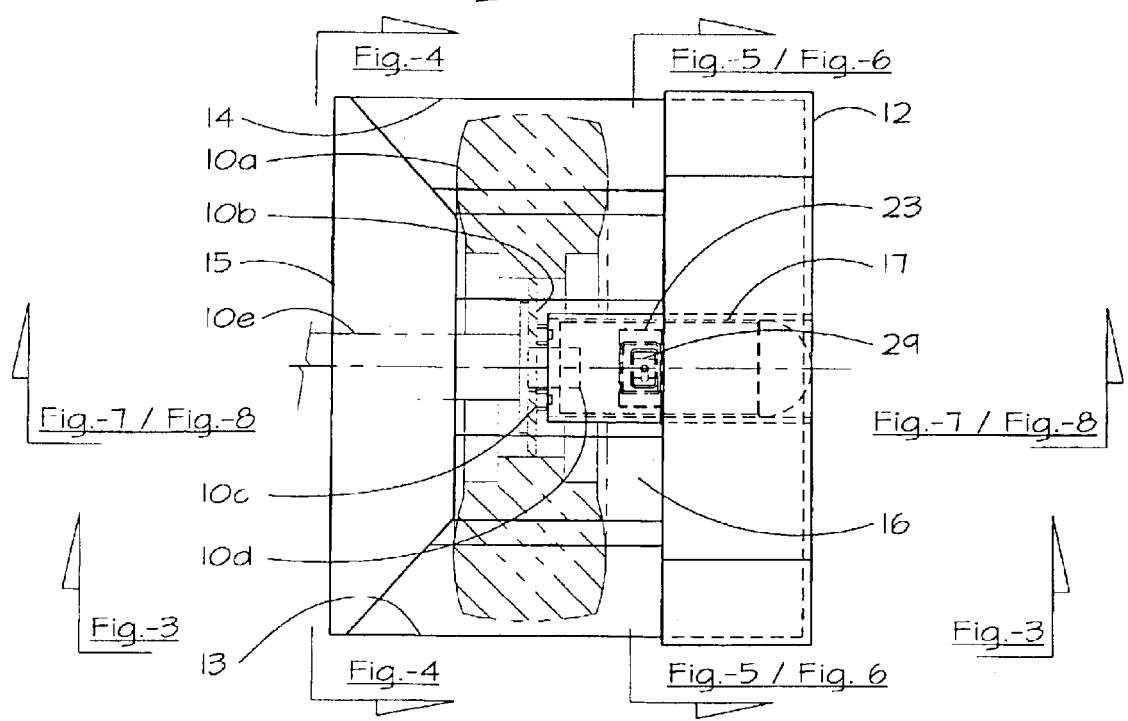
FIG. 2 is a plan of the preferred embodiment of the stationary axle/wheel lock anti-theft device in which the rear wheel chock is at the left and the frontal wheel barrier is at the right of the figure.
Figure 3:
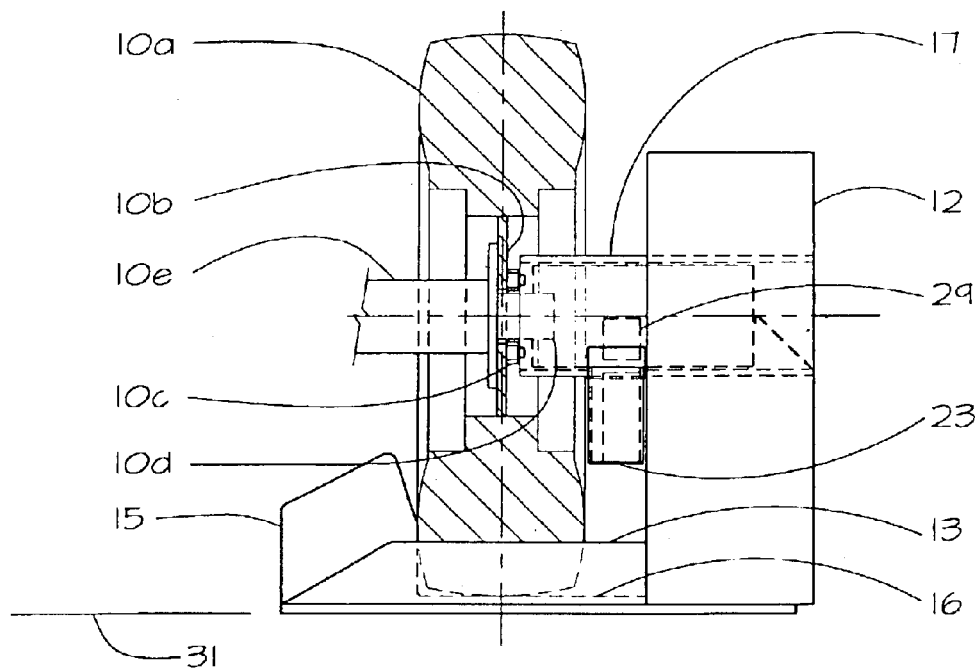
FIG. 3 is a end view of the preferred embodiment of the stationary axle/wheel lock anti-theft device in which the rear wheel chock is at the left and the frontal wheel barrier is at the right of the figure.
Figure 4:
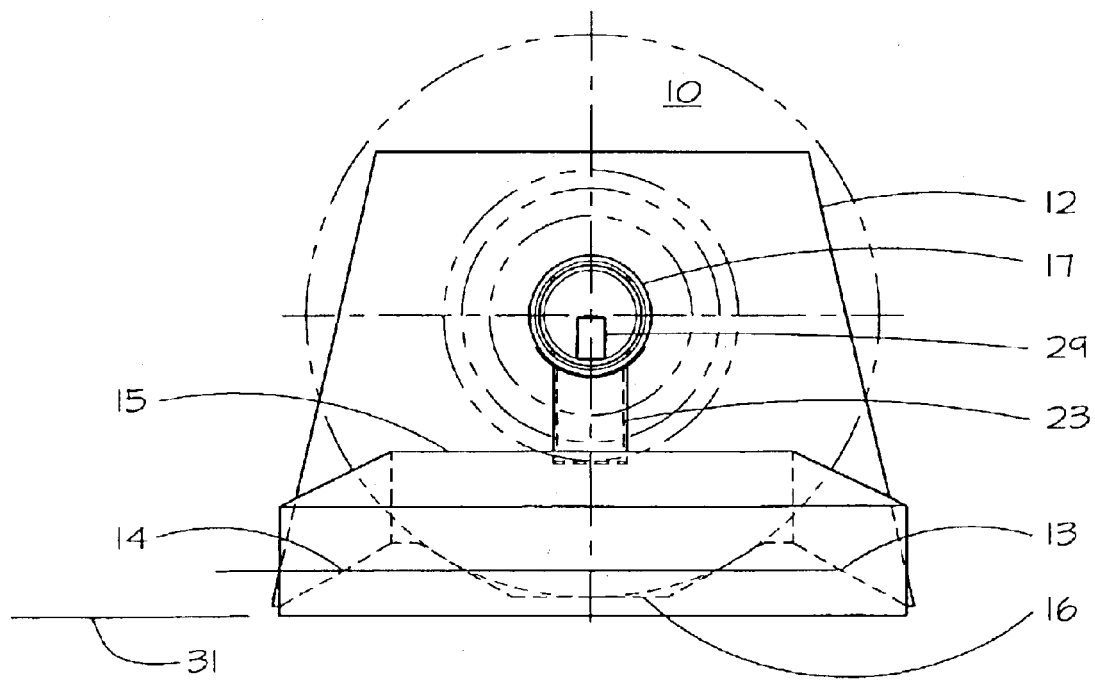
FIG. 4 is an elevation of the preferred embodiment of the stationary axle/wheel lock anti-theft device in which the rear wheel chock is forward of the vehicle axle/wheel assembly and the frontal wheel barrier is behind the vehicle axle/ wheel assembly.

Referring more particular to the drawings, there is illustrated an vehicle wheel assembly, generally indicated at 10 comprises five members, the tire 10a, the wheel rim 10b, wheel nuts 10c, axle hub 10d and axle 10e.

Also referring more particular to the drawings, there is illustrated a stationary axle/wheel lock anti-theft device, generally indicated at 11, comprising five members which complementary engage the vehicle assembly 10. The device assembly includes:
(A) a integral base 11 comprising of a frontal wheel barrier 12, a right wheel chock 13, a left wheel chock 14, a rear wheel chock 15, a bottom wheel support platform 16
(B) a retaining sleeve assembly 17 comprising a outer sleeve member 18, a inner sleeve member 19, stop bar pin positioning holes 20, sleeve spacer members 21 and handle/guard member 22.
(C) a retaining sleeve stop bar assembly 23 comprising a stop bar pin 24, a primary casing 25, a primary concrete barrier 25a, a secondary casing 26, a secondary concrete barrier 26a, a 120 degree guard plate 27 and end cap 28.
(D) a security lock device 29.
(E) a wheel height spacer 30.

The integral base having a generally "L" shaped configuration is formed from concrete complete with re-enforcing bar metal for rigidity throughout. The vehicle wheel assembly 10 is nestled within the three wheel chocks 13,14,15, the frontal wheel barrier 12, the bottom wheel support 16 and or wheel height spacer 30. The wheel chocks 13,14,15, the bottom wheel support 16 and or wheel height spacer 30 localize the axle X-Y-Z-axis plane. The frontal wheel barrier 12 having sufficient structure and surface to accommodate a guide bore, will maintain horizontal orientation and provide a guide way for the retaining sleeve assembly 17 horizontal movement.

The retaining sleeve assembly 17 formed from metal has an inner sleeve member 19 that is attached by welding at each end of its length with sleeve spacers 21 to the outer sleeve member 18. The retaining sleeve assembly handle/guard opening end 17b when pushed, slides the retaining sleeve axle opening end abutment surface 17a towards the wheel rim 10b, encumbering. Horizontal movement of the retaining sleeve assembly 17, stops when the retaining sleeve assembly axle opening end abutment surface 17a contacts said wheel rim 10b front face. The retaining sleeve assembly handle/guard opening end 17b when pulled, slides the retaining sleeve axle opening end abutment surface 17a away from the wheel rim 10b, disengaging the vehicle wheel assembly 10. The retaining sleeve assembly axle-opening end 17a comprises an outer sleeve member 18 and an inner sleeve member 19 that will encircle the vehicle axle hub 10d when the retaining sleeve assembly 17 is extended. With the retaining sleeve assembly axle opening end abutment surface 17a in close proximity to said wheel rim 10b front face, access to the vehicle wheel assembly 10, wheel nuts 10c and axle hub 10d are restricted. With the retaining sleeve assembly 17 extended, the stop bar pin positioning holes 20 are exposed between the rear face of the frontal wheel barrier 12 and the wheel rim 10b front face. The retaining sleeve stop bar assembly stop bar pin 24 can be inserted fully through said holes 20. The security lock device 29 is inserted through the retaining sleeve assembly handle/guard opening end 17b and attached to the retaining sleeve stop bar assembly stop bar pin 24. The retaining sleeve stop bar assembly 23 primary casing 25 and secondary casing 26 profile encompass 72 degrees of the retaining sleeve assembly 17, obstructing the stop bar pin positioning holes 20 and stop bar pin 24. The retaining sleeve assembly 17 surrounds the security lock device 29 and retaining sleeve stop bar assembly stop bar pin 24. The retaining sleeve assembly handle/guard member 22 restricts the access way into the retaining sleeve assembly 17 interior allowing the security lock device 29 and one hand to pass through. The retaining sleeve handle/guard member 22 formed from metal is attached by welding to the outer sleeve member 18. The interior space of said member 22 is filled with concrete 22a to protect the rear section of the guard. With the retaining sleeve assembly 17 fixed, the retaining sleeve assembly handle/guard opening end 17b is shrouded by the frontal wheel barrier 12. Multiple retaining sleeve stop bar positioning holes 20 are provided in the retaining sleeve assembly 17 so close proximity of retaining sleeve assembly opening end abutment surface 17a to wheel rim 10b front face substantially closes any gap between said surfaces. If the vehicle wheel assembly 10 is attached to a particular vehicle that is towed, the pulling action, will case upward travel of said assembly on ramp shaped wheel chock 13 or 14, the wheel rim 10b will contact the retaining sleeve assembly 17 and cause an interference, stopping linear movement. A powered vehicle wheel assembly A will drive upward on the ramp shaped wheel chock 13 or 14, contact the retaining sleeve assembly 17, cause an interference, stopping linear movement. If the force applied is sufficient, a twisting action will cause the integral base 11 to contact the tire 10a and wheel rim 10b, jam, impeding wheel rotation. With the vehicle axle/wheel assembly 10 encumbered, the said wheel assembly and said anti-theft device becomes one large unsprung weight creating a non-rotating anchor at the storage site. The retaining sleeve assembly 17 joggled by the vehicle wheel assembly 10 will jam within the frontal wheel barrier 12 guide way and retaining sleeve stop bar assembly 23. The vehicle wheel assembly 10 can not be lifted off the integral base 11, with retaining sleeve assembly 17 fixed.

The frontal wheel barrier 12, which restricts retaining sleeve assembly 17 Y-Z axis directional movement, is of such size, structure and mass, to repel. The rear wheel chock 15 restricts vehicle wheel assembly 10 "X" directional movement, is of such size, structure, and mass, to repel. The stationary axle/wheel lock anti-theft device is of such mass, to impede movement on a ground surface 31. If successful in dislodging stationary axle/wheel lock anti-theft device from set position, all and any irregularities of said ground surface 31 will hinder course. Movement will be slow and noisy. The stationary axle/wheel lock anti-theft device is of such size and structure to withstand dragging without breakup.

The stationary axle/wheel lock anti-theft device 11 is constructed to withstand direct exposure to severe weather in an open outdoor environment. The retaining sleeve assembly 17, with the sloped handle/guard member 22a limits direct weather exposure to the security lock device 29.

Wheel height spacer 30 allows this stationary axle/wheel lock anti-theft device to be used with various wheel diameters so different vehicles take advantage of its utility. The said spacer 30 raises various vehicle axle/wheel assembly 10 so such coaxial relation with said retaining sleeve assembly 17 ((with said)) is maintained.

The retaining sleeve stop bar assembly 23 is restrained by the security lock device 29, the retaining sleeve assembly 17 is restrained by the retaining sleeve stop bar assembly 23, the vehicle wheel assembly 10 is restrained by the retaining sleeve assembly 17. The combination of the frontal wheel barrier 12, the three wheel chocks 13,14,15, the bottom support platform 16, wheel height spacer 30 and retaining sleeve assembly 17 now restricts the vehicle wheel assembly 10 movement in the X-Y-Z axis plane.

What is claimed is:

1. A stationary axle/wheel lock anti-theft device constructed to withstand direct exposure to severe weather in an open outdoor environment that positions a vehicle axle/wheel assembly of single or multiple tire arrangements, single or multiple axle/wheel arrangements spaced between two and twelve inches apart at the closest portion of the treads of each tire, then encumbering a vehicle wheel assembly in X-Y-Z axis planes thereby preventing free rolling movement of said vehicle axle/wheel assembly thereon comprising:

A) a integral base having a generally 'L' shaped configuration formed from concrete complete with re-enforcing bar metal for rigidity throughout providing a front barrier having a surface equal to or greater than tire diameter, a depth equal to or greater than 1.5 times diameter of wheel lug hole circle, a right wheel chock, a left wheel chock, a rear wheel chock, a solid bottom wheel support platform and mass equal to said volume filled with concrete, to localize a vehicle wheel assembly, and substantially aligning said vehicle axle assembly X-Y-Z axis planes with a retaining sleeve assembly coaxially therewith;

said frontal wheel barrier which restricts access to the front face of a vehicle wheel rim, axle hub, wheel nuts and retaining sleeve assembly; and said frontal wheel barrier formed from concrete complete with re-enforcing bar metal for rigidity throughout having a surface equal to or greater than tire diameter, a depth equal to or greater than 1.5 times diameter of wheel lug hole circle and mass equal to said volume filled with concrete, to provide a restraining bore for said retaining sleeve assembly fixed in the extended position, which restricts said retaining sleeve assembly X-Z axis directional movement, to repel sufficient force applied to said vehicle axle/wheel assembly causing upward travel on ramp shaped wheel chock and contacting said retaining sleeve assembly, stopping linear movement; and said rear wheel chock which restricts said vehicle wheel assembly X-axis directional movement, formed from concrete complete with re-enforcing bar metal for rigidity throughout having a surface equal to length of said solid bottom wheel support platform and height from said solid bottom wheel support platform to under side of said vehicle axle assembly, a depth equal to or greater than said vehicle tire width and mass equal to said volume filled with concrete, to repel, and said solid bottom wheel support platform formed from concrete complete with re-enforcing bar metal for rigidity throughout having a surface equal to length of said front wheel barrier and width equal to combined widths of said frontal wheel barrier, said tire or tires, said rear wheel chock, plus clearance for a retaining sleeve stop bar assembly, a depth equal to or greater than 3 inches and a mass equal to said volume filled with concrete, allows for said tire or tires to rest on between said left and right wheel chocks to that surrounding environmental conditions are not a factor affecting said vehicle axle/wheel assembly encumbering; and said stationary axle/wheel lock anti-theft device of said mass of concrete and steel, to impede movement on a ground surface;

B) said retaining sleeve assembly comprising a outer sleeve member, a inner sleeve member, stop bar pin positioning holes, sleeve spacer members and handle/guard member which occupies a wheel rims inner section wherein said axle hub and wheel nuts are located, obstructing forward or rearward motion once a vehicle wheel assembly makes contact therewith;

a retaining sleeve assembly abutment surface in close proximity to a wheel rim inner section front face, limits access to said vehicle wheel assembly, said axle hub and wheel nuts; and with said retaining sleeve assembly in the extended position, said stop bar pin positioning holes are exposed between the rear face of said frontal wheel barrier and said wheel rim inner section front face allowing said retaining sleeve stop bar assembly stop bar pin to be inserted fully through said stop bar pin positioning holes; and with said stop bar pin positioning holes provided in said retaining sleeve assembly so close proximity of said retaining sleeve assembly abutment surface to said wheel rim inner section front face substantially closes any gap between said surfaces; and with said retaining sleeve assembly fixed in the extended position, said retaining sleeve assembly handle/guard opening end is shrouded by said frontal wheel barrier; and said retaining sleeve assembly which houses a security lock device within its interior; and said retaining sleeve assembly handle/guard member which restricts the access way into said retaining sleeve assembly interior allowing only said security lock device and one hand to pass through, and said retaining sleeve assembly, with said handle/guard member limits direct weather exposure to said security lock device; and with said retaining sleeve assembly fixed in the extended position, said vehicle wheel assembly and said stationary axle/wheel lock anti-theft device of said surface, depth and mass to withstand dragging without breakup, become one large unsprung weight creating a non-rotating anchor; and said retaining sleeve assembly joggled by said vehicle wheel assembly will jam within said frontal wheel barrier guide way and said retaining sleeve assembly;

C) said retaining sleeve stop bar assembly comprising a stop bar bin, a primary casing, a primary concrete barrier, a secondary casing, a secondary concrete barrier, a 120 degree guard plate and end cap therewith;

said retaining sleeve stop bar assembly which is of a simple locking or unlocking operation, is connected by mechanical means to said security lock device of a suitable well known shaft unit; and said retaining sleeve stop bar assembly primary casing and secondary casing profile encompass 72 degrees of said retaining sleeve assembly, obstructing access to said stop bar pin positioning holes and said retaining sleeve stop bar assembly stop bar pin; and said retaining sleeve stop bar assembly is restrained by said security lock device, said retaining sleeve assembly is restrained by said retaining sleeve stop bar assembly, said vehicle wheel assembly is restrained by said retaining sleeve assembly;

D) a wheel height spacer formed from concrete and shaped to fit between said left and right inner ramps of wheel chocks, said solid bottom support platform, said inner face of frontal barrier and said inner face of rear wheel chock to localize vehicle wheel assembly therewith, said wheel height spacer is placed between said solid bottom support platform and said tire or tires substantially aligning said vehicle axle with said retaining sleeve assembly coaxially; and a wheel height spacers of different thickness allows this stationary axle/wheel lock anti-theft device to be used with various wheel diameters so different vehicles take advantage of its utility.

2. A stationary axle/wheel lock anti-theft device as recited in claim 1, wherein said vehicle axle/wheel assembly having an axle hub that extends beyond said wheel rim inner section frontal face, an extended said retaining sleeve assembly abutment substantially encircles said hub adding to movement restriction.

* * * * *